US009067350B2

(12) United States Patent
Meyer-Noack et al.

(10) Patent No.: US 9,067,350 B2
(45) Date of Patent: Jun. 30, 2015

(54) CONTROLLED CIRCUMFERENTIAL IMPREGNATION DEVICE

(75) Inventors: Sven Meyer-Noack, Donauwörth (DE); Jörg Radekopf, Asbach Bäumenhaim (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 993 days.

(21) Appl. No.: 12/774,868

(22) Filed: May 6, 2010

(65) Prior Publication Data
US 2011/0171337 A1   Jul. 14, 2011

(51) Int. Cl.
*B29C 70/44* (2006.01)
*B29C 43/12* (2006.01)
*B29C 43/02* (2006.01)
*B29C 70/54* (2006.01)
*B29L 23/00* (2006.01)

(52) U.S. Cl.
CPC ............... *B29C 43/12* (2013.01); *B29C 43/027* (2013.01); *B29C 70/443* (2013.01); *B29C 70/446* (2013.01); *B29C 70/546* (2013.01); *B29C 2043/028* (2013.01); *B29L 2023/00* (2013.01)

(58) Field of Classification Search
USPC .................................................. 425/128, 393
See application file for complete search history.

(56) References Cited

U.S. PATENT DOCUMENTS

| 3,862,736 | A  | * | 1/1975  | Herro ............................ 249/65 |
| 5,672,227 | A  |   | 9/1997  | Chiu |
| 2001/0048995 | A1 | * | 12/2001 | Eschenfelder et al. ......... 428/69 |
| 2003/0227107 | A1 |   | 12/2003 | Stewart |
| 2004/0026015 | A1 | * | 2/2004  | Frantz et al. .................. 156/203 |
| 2004/0178533 | A1 | * | 9/2004  | Haas et al. .................... 264/236 |
| 2005/0073074 | A1 | * | 4/2005  | Yovichin et al. .............. 264/326 |

OTHER PUBLICATIONS

European Search Report dated Mar. 2, 2010 from corresponding European application.
Search Report and Written Opinion Application No. EP 09400049 Dated Mar. 2, 2010.

* cited by examiner

*Primary Examiner* — Ryan Ochylski
(74) *Attorney, Agent, or Firm* — Brooks Kushman P.C.

(57) ABSTRACT

A device for molding by impregnation of at least one reinforcing layer constituting a piece to be molded or at least one reinforcing layer covering a piece, with a resin in liquid form. The device includes a mold extending around the reinforcing layer by defining a resin circulation space, an end piece for supplying resin in the circulation space, an end piece for evacuating the surplus resin as well as elements for generating a flow of resin in the circulation space. The mold includes a flexible conduit and elements for mechanically deforming the flexible conduit to shape the circulation space according to the impregnation parameters.

20 Claims, 2 Drawing Sheets

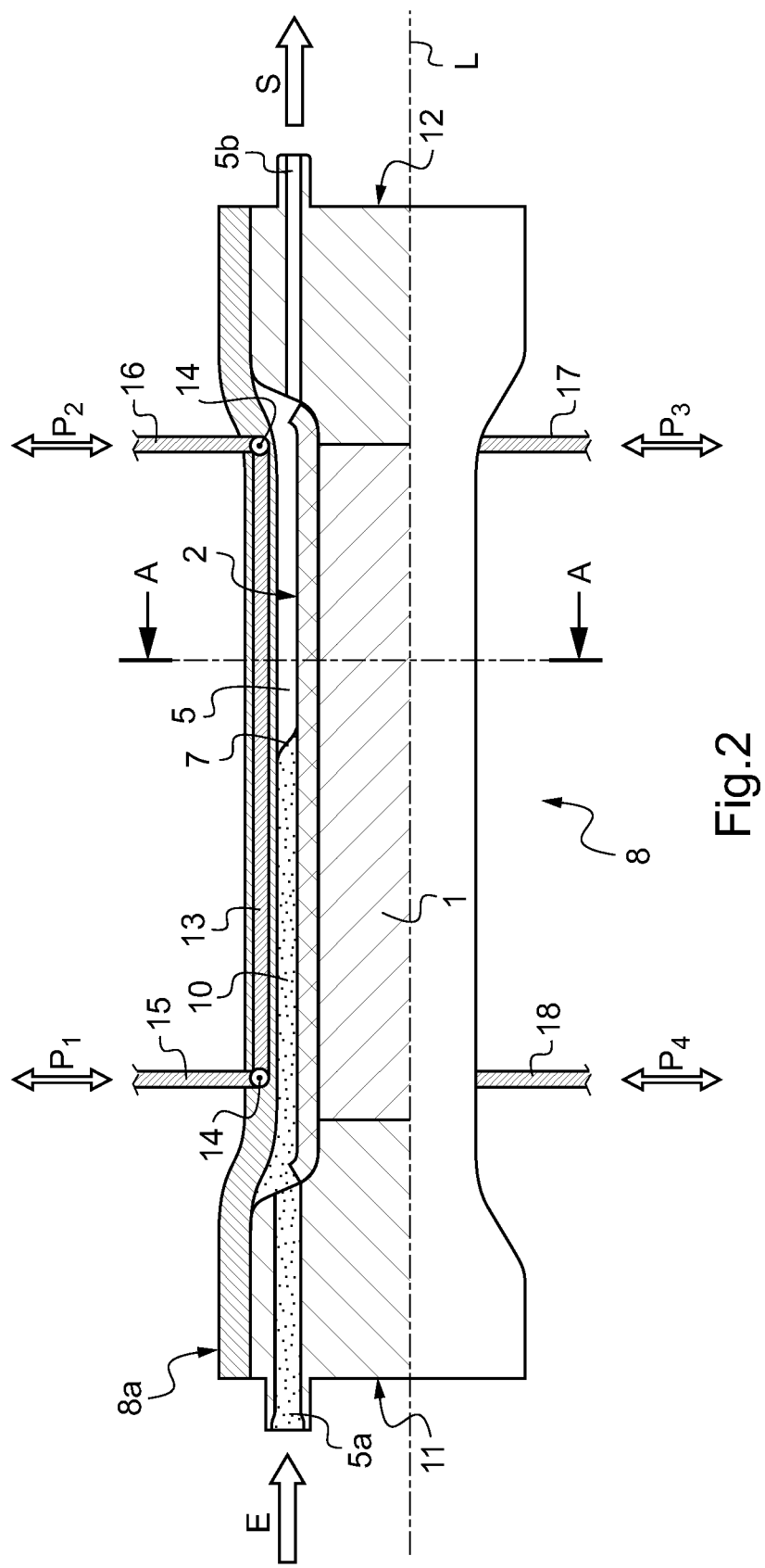

CONTROLLED CIRCUMFERENTIAL IMPREGNATION DEVICE

Figure 1:
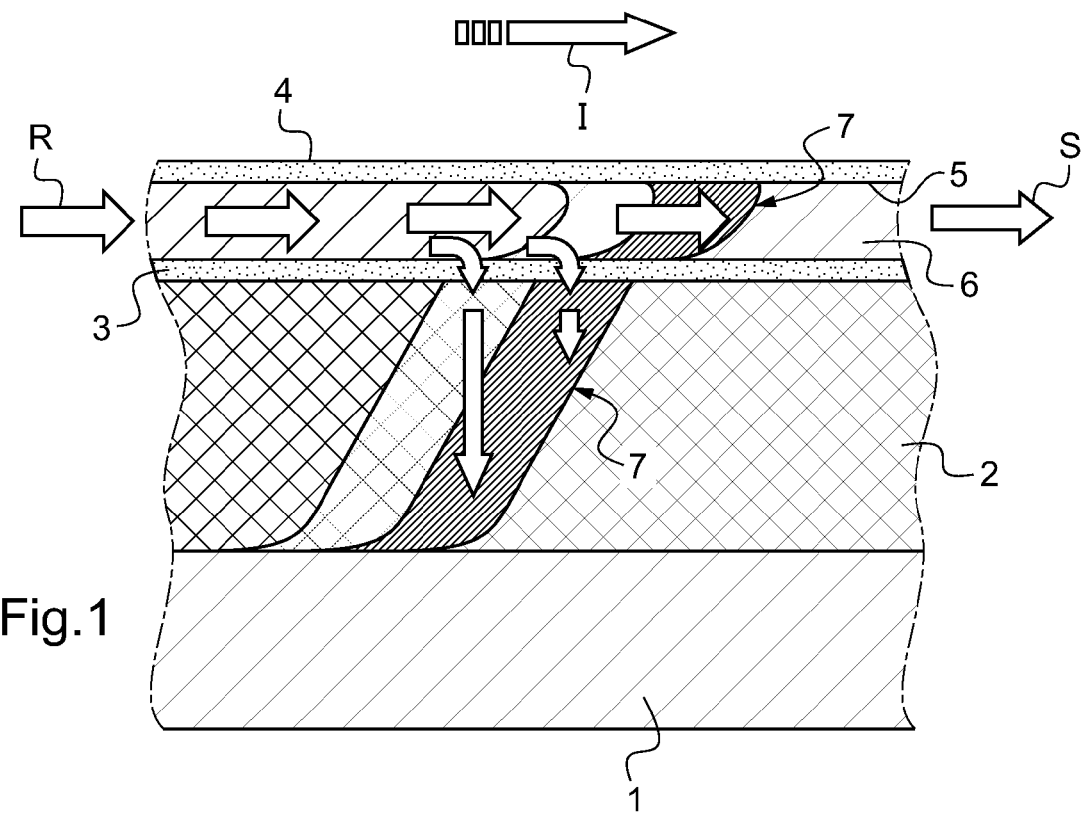

The present invention refers to the general technical field of making structures in reinforced composite materials, particularly materials based on resin impregnated fibres and/or resin impregnated textile materials. These structures are often constituted from an assembly of laminar reinforcement layers among which are found, for example, "stratifil" (also known as roving).

Reinforced parts are, for example, used in aeronautics in general and particularly in the fabrication of aircraft elements or parts, of the rotor, propeller or transmission shaft type or other hollow parts presenting large dimensions.

Impregnation resins are known as such and thus will not be described in detail.

Reinforcement fibre is understood to refer to all materials presenting carbon fibres, Glass fibres, Aramid fibres or hybrid—Thermoplast/Carbon, Glass, Aramid fibres, or other fibres.

Reinforcement textile or fabric is understood to refer to all materials presenting wovens, non wovens, multi axial non wovens, braided goods of the above mentioned materials, knitted fabrics, mesh work or randomly oriented fibres.

Different molding methods by liquid resin impregnation are known. In these methods, generally a preform of the semifinished product/textile type is impregnated, and is covering a mold core. Using preimpregnated materials, known as "Prepreg" is also known, but the latter present the disadvantage of manufacturing, handling and storage costs that are often high.

The wording "matrix" which is well known, is generally used in the following, but the term "resin" which is more specific could also be used without departing from the invention. According to the invention, the matrix is a liquid duroplast material or a liquid thermoplast material.

Making laminar layers manually is also known. The operator turns the parts, for example large-size hollow cylindrical parts, and manually applies the resin onto the fibres. These operations are in many cases difficult to automate and consequently are not reproducible either in terms of dimensional accuracy or physical properties. In addition, it is often necessary to manually perform jointing operations between different parts of the parts.

In standard impregnation methods, one is often confronted with the phenomenon known as "Race-Tracking," in which a preferential circulation of resin is produced, for example along a junction of laminar layers or in a layer presenting a lower fibre density. The resin flow is then not homogeneous. This phenomenon generally leads to poor impregnation of some parts, for example, the inner layers and/or more dense layers. When this phenomenon is produced, the result is a defective piece that is destined to be destroyed.

From among these known impregnation methods, one may cite, for example, the RTM (Resin Transfer Molding) impregnation method, in which very rigid and heavy mold parts are used to resist the high and necessary pressures to close said mold and to prevent the appearance of deformations. When using a preform, the resin should traverse all of said preform before impregnating the last fibres of said preform. The "Race Tracking" phenomenon may occur, particularly when the preform is a laminar construction presenting different permeabilities. With the use of high pressure, it may happen, in addition, that the fibres are displaced under the effect of said pressure.

It may also happen that the use of a non-parallel mold would locally lead to undesired compaction of the material constituting the piece to mold.

In addition, in RTM impregnation methods, one is often confronted with an insufficient evacuation of air contained in the mold.

Conventional fibre winding and weaving methods generally are not adapted for manufacturing pieces that must absorb high impact forces.

In known impregnation methods, often an impregnation medium or means that surrounds the piece that must be impregnated is used to obtain progressive impregnation. This medium, as well as the resin that it contains, generally is not reusable and leads to, first, significant resin losses and, second, environmental problems linked to the reprocessing of said medium.

More particularly, the present invention relates to an impregnation device used in the manufacturing of structures or pieces in composite materials, reinforced by fibres or textiles and, particularly, hollow pieces such as hollow drive shafts.

Thus, the object of the present invention is to propose a device that allows one to be free from the limitations mentioned above.

The object of the present invention is to propose an impregnation device allowing automation of impregnation operations by reducing the number of defective pieces.

Another object of the present invention is to propose an impregnation device allowing impregnation operations to be simplified and the cost to be reduced.

The objects assigned to the invention are reached by using a device for molding by impregnation of at least one reinforcing layer constituting a piece to be molded or at least one reinforcing layer covering a piece, with a resin in liquid form, said device comprising a mold extending around the reinforcing layer by defining a resin circulation space, an end piece for supplying resin into the circulation space, a surplus resin evacuation end piece as well as means to generate a flow of resin in the circulation space, characterized in that the mold comprises a flexible conduit and means for mechanically deforming said flexible conduit to shape the circulation space according to the impregnation parameters.

The molding device according to the invention thus promotes the impregnation of the reinforcing layer.

According to an example of embodiment in conformance with the invention, the deformation means are at least in part integrated or embedded in the material constituting the flexible conduit.

According to an example of embodiment of the device in conformance with the invention, the flexible conduit is an elastomer.

According to an example of embodiment in conformance with the invention, the flexible conduit defines an inner free space, substantially cylindrical before deformation, for the engagement of a piece of the mold core type covered by a reinforcing layer.

According to an example of embodiment in conformance with the invention, the deformation means comprise at least one displaceable rigid rod, integrated in the material constituting the flexible conduit, each end of said rigid rod being articulated on a mobile arm whose position determines the position of the rigid rod and consequently the conformation of the flexible conduit.

According to an example of embodiment in conformance with the invention, the displacement of each mobile arm is driven by electronic, pneumatic or hydraulic means and/or computing means, which allow the stable molding position of each mobile arm to be stored, making the conformation of the flexible conduit and the impregnation operation reproducible for identical pieces.

According to an example of embodiment in conformance with the invention, the rigid rod or rods extends or extend parallel to the longitudinal axis of the flexible conduit.

According to an example of embodiment in conformance with the invention, the flexible conduit comprises at least 4 rigid rods and preferably between 8 and 12 rigid rods. The number of required rods is given by the optimization of the impregnation process with respect of the geometry of the part to be mold.

According to an example of embodiment in conformance with the invention, the rigid rods are distributed and moved in an equidistant and parallel manner in a cylindrical structure with annular section of the flexible conduit. However, the rods are controlled in order to achieve an optimal impregnation, which could also mean, that in some other embodiments in conformity with the invention, they are preferably not moved in a parallel way.

According to an example of embodiment of the device in conformance with the invention, the means to generate the flow of resin in the circulation space are associated with a resin pressurization unit communicating with the supply end piece in order to insert the resin into the molding device.

According to an example of embodiment in conformance with the invention, the means to generate the flow of resin in the circulation space comprise a vacuum source communicating with the evacuation end piece.

The device in conformance with the invention thus allows the resin circulation to be locally modulated and to be adapted to particular constraints by optimizing the shape and dimensions of the resin circulation slot. The circulation front of the resin, within the molding device, can so be influenced.

The impregnation device in conformance with the invention presents the enormous advantage of enabling impregnation to be performed in a single simple and quick operation. In fact, resorting to pre-impregnation steps is pointless.

The device in conformance with the invention allows a reproducible manufacturing quality to be obtained, which is perfectly adapted to manufacturing pieces in series.

In addition, the pieces obtained with the device in conformance with the invention only necessitate very little finishing work. The quality of the surface is depending on the amount of rods. The surface may get better if more rods are used.

The device in conformance with the invention also allows the quantity of resin, which is used for molding the piece, to be adapted and therefore the consumption of said resin to be reduced. Only the needed quantity of resin is inserted into the molding device.

Also, with the device in conformance with the invention, one can avoid using impregnation media, which generally are not reusable. Thus, the device in conformance with the invention presents ecological qualities.

The device in conformance with the invention allows fibre-reinforced high-performance materials and, in particular, high-performance hollow pieces presenting a low voidage constitution to be made.

Due to the fact that the impregnation according to the invention is not performed by pushing the resin with high pressure directly into the preform, no air bubbles are generated. As a result, no resin flush through the flexible conduit is necessary for eliminating these air bubbles. Additionally, the fibre washing is therefore avoided.

Due to a radial insertion of the resin into the preform, no jointing operation between the reinforcement layers is necessary with the method in conformance with the invention. In some examples, a shifting of a layer with respect to another layer, is avoided. No fibre washing occurs.

In addition, the device in conformance with the invention is particularly adapted for the manufacture of laminar pieces with isotropic or orthotropic structures, that is, pieces that do not present isotropy at the level of their physical properties, of the resistance, density, elasticity or other type. One may, for example, locally control the thickness of the resin layer.

The act of using a flexible mold also facilitates the insertion of the core-preform sub-assembly into said mold.

The device in conformance with the invention also allows a preform that is manufactured separately and already presents the dimensions of the piece, for example the length of a shaft, to be used.

The core is advantageously delivered with the preform, which protects said core from possible impacts. The core is also reusable.

It should also be noted that the device in conformance with the invention enables an impregnation method to be implemented that does not expose the operators to handling resin that is often corrosive.

Figure 3:
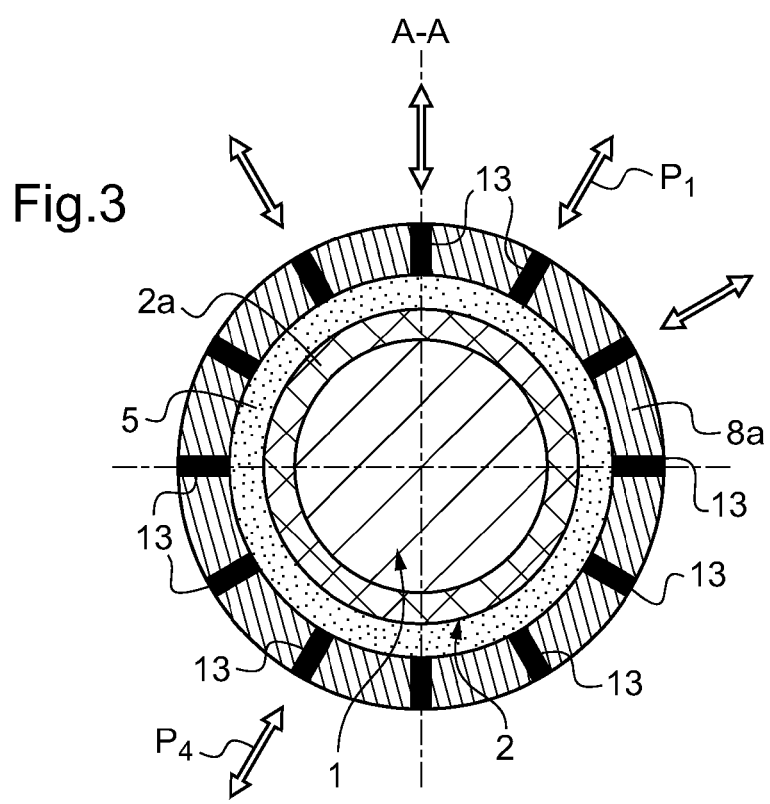

The invention and its advantages will appear with more details in the context of the following description, with an example of embodiment given for illustrative purposes with reference to the attached figures that represent:

FIG. 1, an illustration of an example of implementation of an impregnation method by using resin, according to the prior art, FIG. 2, a partial view in section of an example of an impregnation device in conformance with the invention, and FIG. 3, a view in section along the direction A-A of the impregnation device from FIG. 2.

The structurally and functionally identical elements, present in several distinct figures, are assigned one and the same reference for all of the figures.

According to FIG. 1, illustrating a known impregnation method, element 1 is used, of the piece to cover or core type, covered by a preform 2. This preform 2 is, for example, a semifinished product, whose structure, for example laminar, is based on textiles or fibre layers.

Preform 2 is wrapped in a separation fabric 3 that is permeable to impregnation resin. A vacuum sheet 4 allows a circulation space 5 in which negative pressure (vacuum) is applied to be constituted with the separation fabric 3.

The flow of resin presents a circulation front 7 illustrated in FIG. 1. The resin introduction direction and the impregnation direction are respectively marked by the arrows R and I in FIG. 1. An evacuation arrow S diagrams the expulsion of the surplus resin.

An example of embodiment of an impregnation device in conformance with the invention is illustrated in FIGS. 2 and 3.

The impregnation or molding device 8 comprises a mold extending around the reinforcing layer or around the preform 2, by defining a resin 10 circulation space 5, an end piece 11 for supplying resin 10 into the circulation space 5 and an end piece 12 for evacuating surplus resin 10. The supply end piece 11 and the evacuation end piece 12 respectively comprise openings 5a, 5b communicating with the circulation space 5. The supply and evacuation of resin 10 are shown through arrows E and S respectively.

The molding device 8 comprises a flexible conduit 8a and means for mechanically deforming said flexible conduit to shape the circulation space 5 according to the impregnation parameters. It thus becomes possible to size and shape the circulation space 5.

According to an example of embodiment in conformance with the invention, the deformation means are at least in part integrated into the material constituting the flexible conduit.

The flexible conduit is for example an elastomer.

According to an example of embodiment in conformance with the invention, the flexible conduit defines an inner free space, substantially cylindrical before the deformation of said flexible conduit, for the engagement of element 1, of the piece or core type, covered by a reinforcement layer or by the preform 2.

The deformation means comprise at least one displaceable rigid rod 13, integrated or embedded in the material constituting the flexible conduit. Each end of said rigid rod 13 is articulated, thanks to an articulation 14 to a mobile arm 15, 16 wherein the position determines the position of the rigid rod 13 and consequently the conformation of the flexible conduit. Supplementary mobile arms 17, 18 activating another rigid rod 13, are partially represented in FIG. 2.

The displacement of each mobile arm, diagrammed by arrows P1, P2, P3 and P4, is driven for example by electronic and/or computing means, which allow the stable molding position of each mobile arm 15, 16, 17, 18 to be stored, making the conformation of the flexible conduit and the impregnation operation reproducible for identical pieces.

According to an example of embodiment in conformance with the invention, the rigid rod or rods 13 extends or extend parallel to the longitudinal axis L of the flexible conduit. Each of the rigid rods 13 may preferably be activated individually.

According to an example of embodiment in conformance with the invention, the flexible conduit comprises at least 4 rigid rods 13 and preferably between 8 and 12 rigid rods 13.

According to an example of embodiment in conformance with the invention, illustrated by FIG. 3, the rigid rods 13 are distributed in an equidistant and parallel manner in a cylindrical structure with annular section of the flexible conduit.

According to an example of embodiment in conformance with the invention, the molding device 8 may comprise several longitudinal portions comprising rigid rods 13, extending for example over the entire length of the flexible conduit.

The preform 2 may advantageously be constituted of a laminar assembly 2a of textile or fibre layers. The movements of the rods 13 are also advantageous for facilitating the extraction of reinforced element 1 from conduit 8a after the molding operation.

The impregnation device also comprises means (not represented) to generate a flow of resin 10 in the circulation space 5 until the conduit 8a contains the required quantity of resin. The impregnation occurs due to the pressure into the conduit 8a and/or due to radial movements of the rods 13.

According to an example of embodiment in conformance with the invention, the means to generate the flow of resin in the circulation space 5 comprise a resin pressurization unit, communicating with the supply end piece 11.

According to another example of embodiment in conformance with the invention, the means to generate the flow of resin 10 in the circulation space 5 comprise a vacuum source communicating with the evacuation end piece 12.

Naturally, the present invention is subject to numerous variations regarding its embodiment or implementation. Of course, although several embodiments or implementations have been described, it is clearly understood that it is not conceivable to exhaustively identify all possible modes. Of course, it is possible to replace a means described or a step described by an equivalent means or equivalent step, without departing from the scope of the present invention.

The invention claimed is:

1. A molding device by impregnation of at least one reinforcing layer constituting of a piece to be molded or at least one reinforcing layer covering a piece, with a resin in liquid form, the device comprising a mold extending around the reinforcing layer by defining a resin circulation space, an end piece for supplying resin into the circulation space, an end piece for evacuating surplus resin as well as means for generating a flow of resin in the circulation space, wherein the mold comprises, a flexible conduit, and means for mechanically deforming the flexible conduit, to shape the circulation space according to the impregnation parameters, the means for mechanically deforming the flexible conduit being at least in part integrated or embedded in the material constituting the flexible conduit and comprising at least one displaceable rigid rod, integrated in the material constituting the flexible conduit, each end of the rigid rod being articulated on a separate mobile arm, the position of the mobile arms determining the position of the rigid rod and consequently the conformation of the flexible conduit.

2. The device according to claim 1, wherein the displacement of each mobile arm is driven by electronic and/or computing means, which allow the stable molding position of each mobile arm to be stored, making the conformation of the flexible conduit and the impregnation operation reproducible for identical pieces.

3. The device according to claim 2, wherein the at least one displaceable rigid rod comprises a plurality of rigid rods extending parallel to the longitudinal axis of the flexile conduit.

4. The device according to claim 1, wherein the at least one displaceable rigid rod comprises a plurality of rods that parallel to the longitudinal axis of the flexible conduit.

5. The device according to claim 4, wherein the flexible conduit comprises at least 4 rigid rods.

6. The device according to claim 5, wherein the rigid rods are distributed in an equidistant and parallel manner in a cylindrical structure within annular sections of the flexible conduit.

7. The device according to claim 1, wherein the means for generating the flow of resin in the circulation space comprise a resin pressurization unit communicating with the supply end piece in order to insert the required quantity of resin into the circulation space.

8. The device according to claim 1, wherein the means for generating the flow of resin in the circulation space comprise a vacuum source communicating with the evacuation end piece in order to insert the required quantity of resin into the circulation space.

9. The device according to claim 1, wherein the flexible conduit is made of an elastomer.

10. The device according to claim 1, wherein the flexible conduit defines a free inner space, substantially cylindrical before deformation of the flexible conduit, for the engagement of an element or a piece of the mold core type covered by a reinforcing layer.

11. The device according to claim 9, wherein the flexible conduit defines a free inner space, substantially cylindrical before deformation of the flexible conduit, for the engagement of an element or a piece of the mold core type covered by a reinforcing layer.

12. The device of claim 1, further comprising wherein each end of the rigid rod is articulated on the respective mobile arm by an articulated connection integrated or embedded in the material constituting the flexible conduit.

13. A molding device for impregnating a preform comprising at least one reinforcing layer with a resin in liquid form, the device comprising:
- a flexible mold extending around the preform to define a resin circulation space;
- a resin flow generator;
- an end piece for supplying resin into the circulation space; and
- an end piece for evacuating surplus resin from the circulation space, wherein the flexible mold comprises a flexible conduit having an inner circumferential wall and an outer circumferential wall and at least one deformation member disposed between the inner and outer circumferential walls for mechanically deforming the flexible conduit, the at least one deformation member comprising at least one rigid rod extending parallel to a longitudinal axis of the flexible conduit, each of the at least one rigid rod having a respective first end articulated on a respective first mobile arm and a respective second end articulated on a respective second mobile arm, to shape the circulation space according to the impregnation parameters.

14. The device according to claim 13, wherein the at least one rigid rod comprises a plurality of rigid rods extending parallel to the longitudinal axis of the flexible conduit and distributed in an equidistant and parallel manner within annular sections of the flexible conduit.

15. The device of claim 14, wherein the plurality of rigid rods are configured to move radially in parallel motion to shape the circulation space.

16. The device according to claim 14, wherein the plurality of rigid rods comprises at least four equally and radially spaced rigid rods.

17. The device of claim 13, wherein each respective first end is articulated on the respective first mobile arm by a respective first articulated connection and each respective second end is articulated on the respective second mobile arm by a respective second articulated connection, the respective first and second articulated connections being disposed between the inner and outer circumferential walls.

18. A molding device for impregnating a reinforcing layer preform with a liquid resin, the device comprising:
- a mold core for supporting the preform;
- a flexible conduit for extending around the preform and cooperating with the mold and the preform to define an annular resin circulation space;
- an end piece for supplying resin into the circulation space;
- an end piece for evacuating surplus resin from the circulation space; and
- at least four movable rigid rods disposed within the flexible conduit and extending parallel to a longitudinal axis of the flexible conduit to shape the circulation space according to the impregnation parameters, each respective rigid rod having a respective first end articulated on a respective first mobile arm and a respective second end articulated on a respective second mobile arm, the rigid rods being distributed in an equidistant and parallel manner in a cylindrical structure within annular sections of the flexible conduit.

19. The device according to claim 18, wherein the at least four movable rigid rods comprise eight to twelve rigid rods extending parallel to the longitudinal axis of the flexible conduit and distributed in an equidistant and parallel manner within the flexible conduit.

20. The device of claim 18, wherein the at least four rigid rods are configured to move radially in parallel motion to shape the circulation space.

* * * * *